No. 682,900. Patented Sept. 17, 1901.
G. J. BACHMANN & G. McCONNELL.
POTATO PLANTER.
(Application filed Oct. 31, 1900.)
(No Model.) 2 Sheets—Sheet 1.
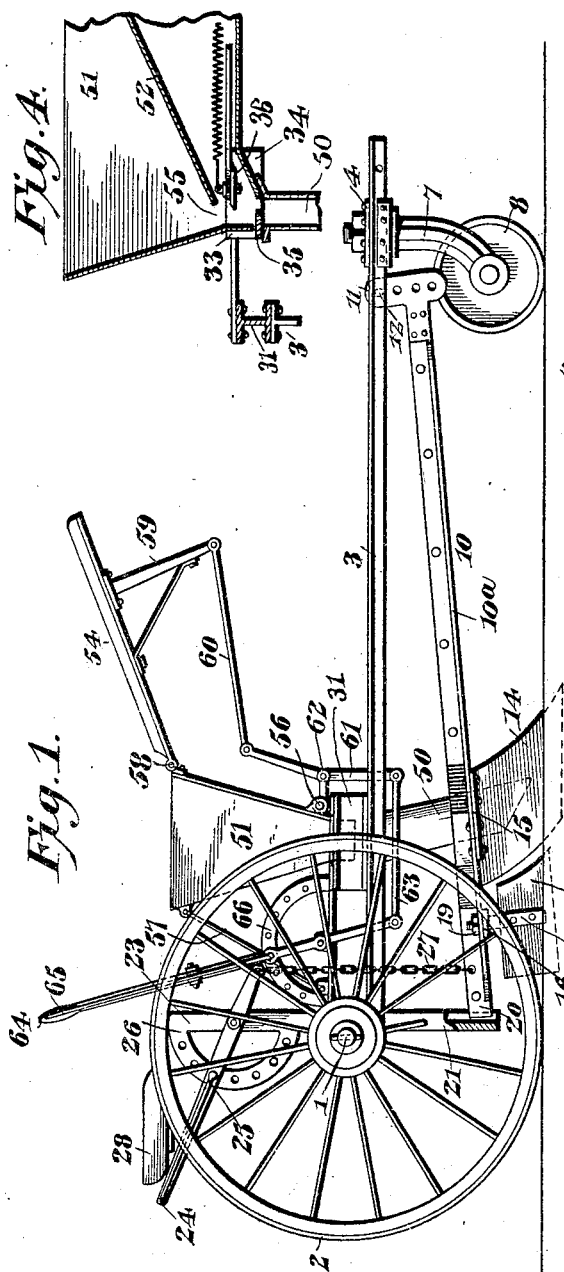
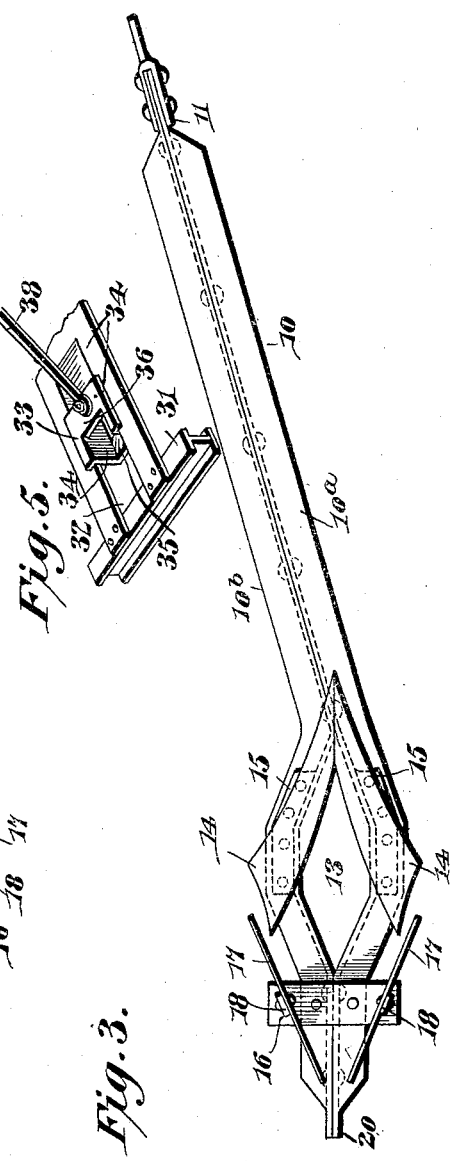
George J. Bachmann
George McConnell,
Inventors
Witnesses

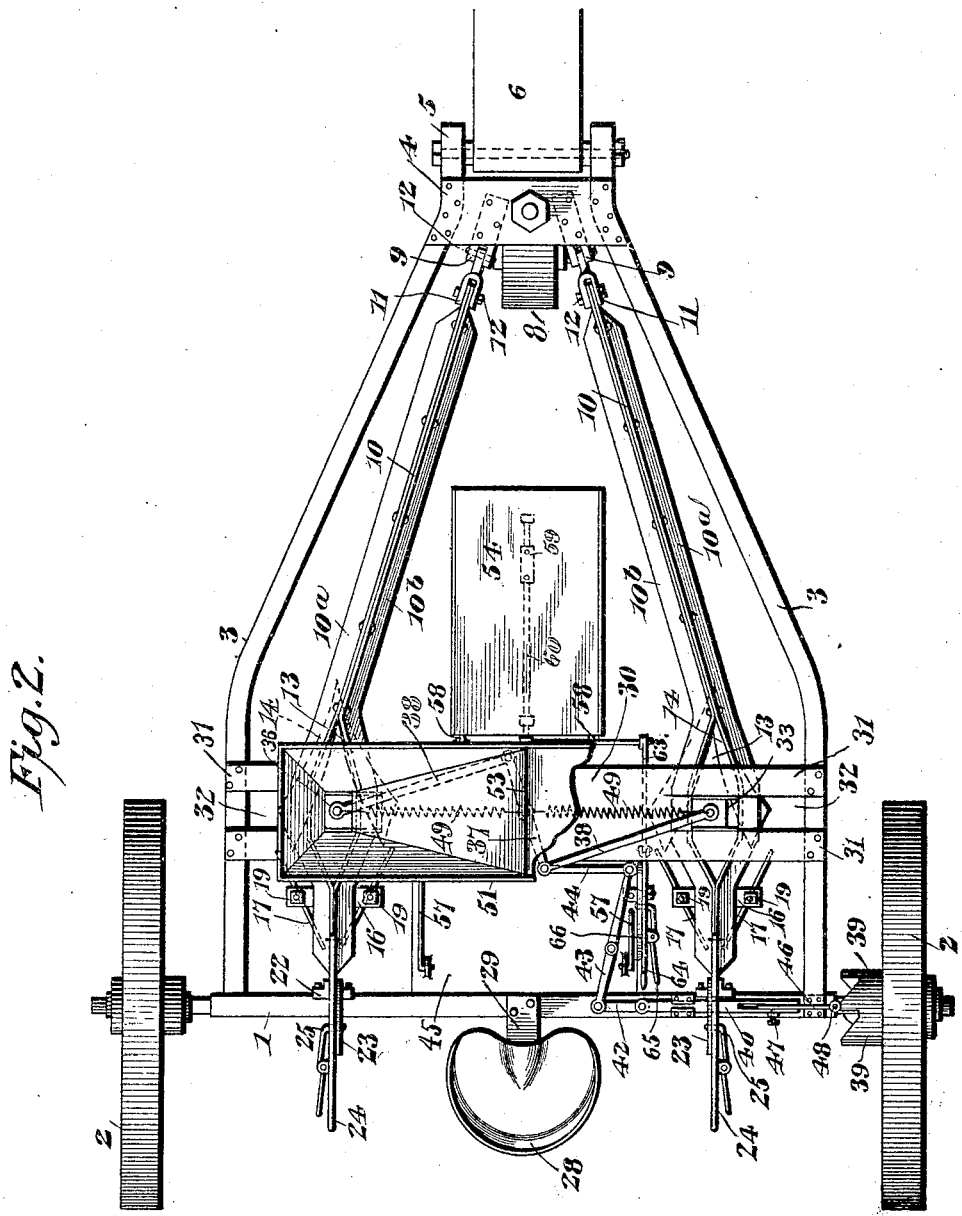

UNITED STATES PATENT OFFICE.

GEORGE JOHN BACHMANN AND GEORGE McCONNELL, OF MUSKEGON, MICHIGAN.

POTATO-PLANTER.

SPECIFICATION forming part of Letters Patent No. 682,900, dated September 17, 1901.

Application filed October 31, 1900. Serial No. 35,059. (No model.)

*To all whom it may concern:*

Be it known that we, GEORGE JOHN BACHMANN and GEORGE McCONNELL, citizens of the United States, residing at Muskegon, in the county of Muskegon and State of Michigan, have invented a new and useful Potato-Planter, of which the following is a specification.

Our present invention relates to a novel potato-planter of that class which embodies a frame supported upon wheels and carrying plows and covering devices in conjunction with feed mechanism operated automatically by the movement of the wheels to cut the potatoes and drop the pieces at regular intervals into the furrows behind the plows and immediately in advance of the coverers.

The object of the invention is to simplify the construction of the planter and to reduce the cost of manufacture to the minimum while greatly increasing its effectiveness by reason of the incorporation of certain peculiarities of construction and arrangement hereinafter described, and illustrated in the accompanying drawings, in which—

Figure 1 is a side elevation of our planter complete. Fig. 2 is a top plan view thereof. Fig. 3 is a bottom plan view of one of the plow-beams, illustrating the manner of connection of the plow thereto and showing the mounting of the coverers. Fig. 4 is a sectional view through one end of the hopper, illustrating the manner in which the feed-slides cut and drop the potatoes; and Fig. 5 is a detail perspective view illustrating the construction and mounting of one of the slides.

Referring to the numerals employed to designate corresponding parts throughout the views, 1 indicates the axle of our planter, supported by the carrying-wheels 2 and bolted or otherwise connected to the side bars 3 of the frame, which are preferably formed of angle-iron for the purpose of strength and lightness, and their front ends are held in convergent relation by the forward frame-plate 4, bolted thereto. The front ends of the frame-bars constitute hounds 5 for the attachment of the draft-tongue 6, and the front frame-plate 4 serves as a support for the standard 7 of a pilot or caster wheel 8, constituting a support and guide for the forward or front end of the planter. The plate 4 also serves as a support for a pair of beam-supporting brackets 9, to which the front ends of the plow-beams 10 are pivotally and adjustably connected, as by means of the clevis-plates 11, provided with a vertical series of openings provided for the reception of a pin 12, passed through the ears of the brackets 9. The plow-beams 10 extend rearwardly in divergent relation, and each is composed of a pair of angle-irons $10^a$ and $10^b$, disposed with their vertical webs or flanges above their horizontal flanges and riveted or otherwise connected. At a point somewhat in advance of their rear ends the beam sections or irons $10^a$ and $10^b$ of each beam are spread to define intermediate openings 13 for a purpose which will be made apparent. The plows 14 are secured to the under sides of each of the beams at the forward end of the openings 13 by bolting the head-plates 15 of the plows to the horizontal flanges of the angle-irons at opposite sides of the openings, and immediately in the rear of the latter each beam is provided with a transversely-disposed supporting-plate 16, bolted to the beam and sustaining in each instance a pair of coverers or covering-plates 17, supported at the lower end of shanks 18, the upper ends of which are threaded and passed through openings in the plate 16 for the reception of jam-nuts 19, which serve to retain the coverers in their adjusted positions. This form of mounting for the plates or coverers 17 enables them to be adjusted vertically or angularly in accordance with the contingencies of use, as it is evident that the shanks 18 may be passed endwise through the supporting-plates and are capable of such axial movement as will facilitate the angular adjustment of the coverers. The beams thus equipped with plows and covering-plates are provided at their rear extremities with what may be termed "guide-lugs" 20, preferably, although not necessarily, formed by extending the rear ends of the connected vertical flanges of the angle-irons, as shown. These lugs 20 extend into vertical beam-guides 21, provided with adjustable attaching devices or clamps 22, secured to the axle 1, and are extended above the axle to form supporting-standards 23 for the beam-adjusting levers 24, provided with detents 25, disposed for engagement with the segmental racks 26, carried by and preferably integral with the standards 23. The short ends of the beam-adjusting levers 24 are connected with the rear ends of the plow-beams—as, for instance, by chains or other flexible pieces 27—in order that the beams may be raised or lowered and their longitudinal inclination regulated by means of the beam-levers 24, both of which are disposed in convenient proximity to the driver's seat 28, whose support 29 is bolted to the axle 1 at its center. Thus the shifting of the positions of the levers 24 will effect the elevation or depression of the plow-beams which swing from the pins 12 and are prevented from yielding to any torsional strain by the guides 21, within which the guide-lugs 20 reciprocate.

Having now described the planter in so far as the furrow opening and covering devices are concerned, we will proceed to a description of that portion of the structure which comprehends the potato cutting, feeding, and delivering mechanism, all of which coöperate to cut the potatoes into planting-eyes and to deposit them into the furrows immediately behind the plows and into positions to be covered as the covering-plates are moved forward by the advance of the machine. These various mechanisms are carried for the most part by a transverse platform 30, located a short distance in front of the axle 1 and directly over the openings 13 in the plow-beams. It is desirable that the platform be disposed in the horizontal plane of the axle, and it is therefore supported upon I-beams 31, bolted or otherwise secured upon the side beams 3 of the frame. At its opposite ends the platform 30 is bifurcated or divided, as best shown in Figs. 2 and 5 of the drawings, to form ways 32, within which reciprocate the feed-slides 33, preferably constructed of metal and comprising side walls 34, guided upon the platform upon opposite sides of the way and connected by a bottom or gage plate 35, located at the outer end of the slide, and a top plate or cutter 36, disposed in a plane immediately behind the bottom or gage plate 35 for a purpose which will presently be made apparent. Both of the feed-slides are connected to a slide-actuating lever 37, fulcrumed at the center of the platform, the preferable mode of effecting such connection comprehending a pair of pitmen 38, pivotally connected at their outer ends to the top plates or cutters 36 of the feed-slides and at their inner ends to the opposite extremities of the slide-actuating lever 37, as shown more clearly in Fig. 2. It will thus appear that the transmission of oscillatory motion to the lever 37 will effect the simultaneous reciprocation of the feed-slides in opposite directions. This motion we effect automatically by the advance of the planter by providing one of the carrying-wheels with a cam-collar 39, arranged to operate a slide 40, suitably guided upon the axle 1 and connected at its inner end, as by a link 42, to the rear extremity of a lever 43, which is connected at its opposite end, as by a link 44, with the contiguous extremity of the actuating-lever 37, the lever 43 being pivotally mounted upon the foot-rest 45, which extends between the platform and the axle at the center of the frame. The slide 40, which we shall denominate a "tappet" in the claims for the purpose of distinguishing it from the feed-slides, is provided at its outer end with an adjustable extension 46, designed to be retained in its adjusted positions by an adjustment-screw 47, and carrying at its outer extremity an antifriction-roller 48, which when the extension is properly adjusted will ride upon the cam 39 to effect the reciprocation of the slide or tappet 40 and the consequent reciprocation of the feed-slides through the intermediate mechanism. Inasmuch as the outward movement only of the feed-slides is resisted by the potatoes we form the cam with alternate inclined and abrupt faces, so that the outward movement of the feed-slides is effected under the positive impulse of the cam; but their retraction is effected by means of a retracting-spring 49, connected at one end to a fixed part of the platform and at its opposite end to one of the slides, as shown in Fig. 2, or, if desired, a pair of these springs may be employed to insure the effective retraction of the slides when the roller 48 is presented opposite one of the abrupt faces of the cam 39. The feed-slides are movable over and are designed to deposit the potatoes in the upper ends of dropper-tubes 50, depending below the platform and extended through the openings in the beams. Above the platform is supported a double hopper 51, the bottom wall 52 of which is inclined in opposite directions from an elevated crest 53, formed at its center, in order that potatoes fed from a bag carried upon a bag support or table 54, located above and in advance of the hopper, will be divided by the crest and gravitate to the feed-slides. As more clearly shown in Fig. 4 of the drawings, the end walls of the hopper are extended downwardly within the ways 32, but terminate slightly above the plane of the bottom or gage plates 35 of the slides, as more clearly shown in Fig. 4. By this arrangement the gage-plates 35 will in the retracted position of the slide be located directly above the upper end of the dropper-tube 50, and the potato, as it drops through the bottom opening 55 of the hopper, will rest upon the plate 35 and in position to be severed by the cutter 36. If now the slide is moved outwardly, the cutter will sever the potato, which will be retained against lateral movement by the extension of the hopper-wall, and by the time the cutter-plate has performed its function the gage or bottom plate 35 will have passed beyond the upper end of the tube 50, into which the severed portion of the potato will be dropped; but the potatoes in the hop- per will be prevented from gravitating to the tube by reason of the advanced position of the cutter, and as the retraction of the latter is accompanied by a similar retraction of the plate 35 the latter will again become the support for the potatoes and when again thrust forward will permit, as before, such portion of a potato as may be confined below the cutter to gravitate through the tube. The employment of this character of feed and cutting mechanism makes it desirable that ready access may be had for the purpose of cleaning or repair, and we prefer therefore to mount the hopper upon the platform by means of one or more hinges 56, located at the bottom of the front side of the hopper, as shown in Fig. 1. This will permit the hopper to be swung back to facilitate the inspection or repair of the mechanism located below it, and at the same time said hopper will be rigidly retained when in use by means of brace-rods 57, swung from its rear wall and hooked at their lower ends to the foot-rest 45.

We have referred to the sack or bag support or table 54 as being mounted at the top of the hopper for the purpose of supporting a bag or sack from which the potatoes are fed to the hoppers or to the double hopper. This table is an important feature of our planter, and we contemplate an arrangement of this table which will permit the driver to change its inclination from time to time in order to effect the gravitation of the potatoes at proper speed—that is to say, as the quantity of potatoes carried by the table is decreased it may be necessary to elevate the table somewhat or to dispose it at a different inclination. To this end, therefore, we hinge the rear edge or end of the table 54 to the upper front corner of the hopper, as by hinges 58, and from the under side of the table adjacent to its free end is secured a pendent table-support 59, pivotally connected to one end of a link 60, whose opposite end is likewise connected to the upper extremity of a lever 61, fulcrumed upon a bracket 62, outstanding from the rear edge of the platform. The lower end of the lever 61 is in turn connected, as by a link 63, with the lower extremity of a table-adjusting lever 64, fulcrumed upon the foot-rest 45 at one side thereof and retained in its adjusted positions by a detent or latch 65, arranged for engagement with the segmental rack 66. It is evident that by the adjustment of the lever 64 the position of the lever 61 will be changed for the purpose of raising or lowering the table 54, and thereby changing the inclination of the latter to suit the contingencies of use, and at the same time the hopper may be swung back or tilted whenever it may be necessary to rearrange or clean the mechanism located below it.

We have stated that the table 54 is intended to support a sack containing potatoes, and while this may be a preferable procedure the potatoes may be deposited loosely upon the table, which latter is for this reason provided with guard-rails at its opposite sides, as shown.

From the foregoing description the operation of the planter will be readily understood; but it may be briefly summarized as follows: The plow-beams having been adjusted in accordance with the nature of the ground, by placing the pins 12 in any one of the openings in the clevis-plates the depth of the furrow and the pitch or inclination of the beams may be regulated by elevating or depressing their rear ends through the manipulation of the beam-adjusting levers 24, it being assumed that the coverers 17 have been vertically and angularly adjusted to insure their effective operation. The potatoes are now deposited upon the table 54, the inclination of which has been determined by the position of the table-adjusting lever 64, the handle of which is located within convenient reach of the driver. As the planter is drawn over the ground the plows will open the furrows and the rotation of the cam 39 will effect the reciprocation of the tappet 40 and the consequent reciprocation of the feed-slides. The latter, as the potatoes are fed down the inclined walls of the hopper, will sever and drop the planting-eyes through the tubes 50 into the furrows, which will be covered in an obvious manner by the advance of the coverers. Should the proper operation of the machine be interfered with by the clogging of the feed mechanism, the brace-rods 57 may be released and the hopper swung back in the manner heretofore described, or if it should be desired to regulate the distance between the furrows this may be readily accomplished by shifting the clamps 22 along the axle and by securing them in their adjusted positions, the carrying-wheels serving ordinarily as markers, although obviously permitting the use of other marking devices, should it be found necessary.

From the foregoing it will be observed that we have produced a simple, ingenious, inexpensive, and durable planter embodying a construction best calculated to effect the accomplishment of the several objects stated; but while the present embodiment of the invention appears at this time to be preferable we desire to reserve the right to effect such changes, modifications, and variations as may be suggested by experience and experiment, so long as they are embraced within the scope of the protection prayed.

What we claim is—

1. In a planter, the combination with a frame, supporting-wheels, and furrow-opening plows, of a transverse platform, dropper-tubes depending therefrom, separate hoppers disposed above the platform to deliver seeds to the dropper-tubes, and means common to both hoppers for supplying them with seeds, said means being located in advance of the hoppers.

2. In a planter, the combination with a frame, carrying-wheels and plows, of a platform extending transversely across the frame and provided with terminal ways, feed-slides mounted for movement in said ways, means for operating the slides, dropper-tubes depending from the platform, a double hopper having a bottom wall inclined in opposite directions from a central crest, and an adjustable table located beyond one end of the crest and disposed to deliver seeds to both compartments of the hopper for subsequent delivery to the dropper-tubes.

3. In a potato-planter, the combination with a frame, carrying-wheels and plows, of a transverse platform extending across the frame, feed mechanism comprising a plurality of feed-slides mounted on the platform, a slide-actuating lever for effecting the simultaneous movement of the slides, a second lever located in rear of the platform and operatively connected to the slide-actuating lever, a tappet connected to the second lever, a cam for actuating said tappet, a double hopper disposed over the platform, an adjustable table located in advance of the hopper and disposed to deliver seeds to both comparments thereof, and means located in rear of the platform for effecting the adjustment of the table.

4. In a potato-planter, the combination with a frame, plow-beam and plow, of feed mechanism carried by the frame, a hopper located above the feed mechanism, an adjustable feed-table located in advance of the hopper, a driver's seat located in rear of the hopper, and a table-adjusting device located in proximity to the driver's seat and operatively connected with the table.

5. In a potato-planter, the combination with a frame, plow-beam and plow, of feed mechanism carried by the frame, a hopper mounted above the feed mechanism, a table hinged to the hopper and located in advance thereof, a table-adjusting lever, and means for operatively connecting said lever with the table.

6. In a planter, the combination with a hopper and a hinged feed-table carried thereby, of a pendent table-support carried by the table, a lever mounted below the table, a table-adjusting lever located at the side of the hopper opposite the table, and links connecting the levers and also connecting the first-named lever to the table-support.

7. In a planter, the combination with a hopper provided with a bottom wall inclined in opposite directions from a central crest, of a table disposed beyond one end of the crest, and means for adjusting the inclination of said table.

8. In a planter, the combination with a frame and feed mechanism, of a plow-beam pivotally supported at one end by the frame, a laterally-adjustable beam-guide located at the rear end of the frame for the reception of the rear extremity of the beam, means for raising and lowering said beam and means for retaining the beam-guides in their adjusted positions.

9. In a planter, the combination with a frame comprising an axle and carrying-wheels, of plow-beams pivotally mounted at one end within the frame, pendent beam-guides carried by the axle and laterally adjustable thereon, and beam raising and lowering devices adjustable with said guides.

10. A plow-beam for planters composed of a pair of connected angle-irons spread apart at a point intermediate of their length to form an opening, a plow carried by said beam, a supporting-plate likewise secured to the beam in the rear of the opening and adjustable covering-plates carried by said supporting-plate.

11. A feed-slide for planters comprising side walls and intermediate relatively-fixed transverse gage and cutter plates in different vertical and horizontal planes.

12. In a planter, the combination with a hopper, and a hinged feed-table carried thereby, of a table-adjusting lever located at the side of the hopper opposite the table, and connecting mechanism intermediate of the table and lever.

13. In a planter, the combination with a frame and a double hopper hinged to the frame, and having its bottom wall formed with a central crest, of a feed-table hinged to the upper edge of the hopper beyond one end of the crest for the purpose of delivering seeds at opposite sides thereof, and a lever disposed to effect the adjustment of the feed-table.

14. In a planter, the combination with a frame, of plow-beams pivotally mounted at one end within the frame, laterally-adjustable beam-guides pendent from the frame and disposed to receive and guide the rear extremities of the plow-beams, levers mounted on the guides for adjusting the said beams within the guides, means for retaining the levers in their adjusted positions, and means for retaining the guides.

In testimony that we claim the foregoing as our own we have hereto affixed our signatures in the presence of two witnesses.

GEORGE JOHN BACHMANN.
   GEORGE McCONNELL.

Witnesses:
 ORVILLE KOON,
 ISAC GUDESKEY.